US012663839B2

(12) United States Patent
Lu et al.

(10) Patent No.: US 12,663,839 B2
(45) Date of Patent: Jun. 23, 2026

(54) LAPTOP COMPUTER WITH DROP-DOWN HINGE

(71) Applicants:Micro-Star International Co., Ltd., New Taipei City (TW); MSI Electronics(Kunshan) Co. Ltd., Kunshan City (CN)

(72) Inventors: Chih-Hang Lu, New Taipei City (TW); Chun-Wen Wang, New Taipei City (TW)

(73) Assignees: MICRO-STAR INTERNATIONAL CO., LTD., New Taipei City (TW); MSI ELECTRONICS(KUNSHAN) CO. LTD., Kunshan City (CN)

( * ) Notice: Subject to any disclaimer, the term of this patent is extended or adjusted under 35 U.S.C. 154(b) by 90 days.

(21) Appl. No.: 18/884,468

(22) Filed: Sep. 13, 2024

(65) Prior Publication Data

US 2026/0050300 A1 Feb. 19, 2026

(30) Foreign Application Priority Data

Aug. 19, 2024 (TW) .................................. 113131084

(51) Int. Cl.
*G06F 1/16* (2006.01)
*G06F 1/20* (2006.01)
(52) U.S. Cl.
CPC .......... *G06F 1/1681* (2013.01); *G06F 1/1616* (2013.01); *G06F 1/203* (2013.01)
(58) Field of Classification Search
CPC ...... G06F 1/203; G06F 1/1616; G06F 1/1681; G06F 1/1656; G06F 1/181; G06F 2200/202
See application file for complete search history.

(56) References Cited

U.S. PATENT DOCUMENTS 9,740,253 B2 * 8/2017 Cheng ................... G06F 1/1681
2008/0043429 A1 * 2/2008 Tatsukami .............. G06F 1/203
361/679.54

(Continued)

FOREIGN PATENT DOCUMENTS

TW 202347082 A * 12/2023

OTHER PUBLICATIONS

Machine Translation for TW202347082 (Year: 2026).*

Primary Examiner — Sagar Shrestha
Assistant Examiner — Peter Krim
(74) Attorney, Agent, or Firm — WPAT, PC

(57) ABSTRACT

The present application provides a laptop computer with drop-down hinge, in which the laptop computer comprises a first casing, a connection assembly, a lid, and a second casing. The second casing is connected to the first casing via the connection assembly. The lid covers an opening disposed on the second casing. When the second casing rotates corresponding to the first casing, the opening of the second casing moves to correspond to the hole of the first casing. In addition, the connection assembly brings the lid to drive the lid rotate and move away from the opening of the second casing. Thereby, the opening of the second casing is correspondingly communicated with the hole of the first casing and thus solving the problem of heat accumulation at the lower edge of the display when the laptop computer with drop-down hinge is operated at an unfolded condition.

10 Claims, 11 Drawing Sheets

(56) References Cited

U.S. PATENT DOCUMENTS

2020/0285273 A1 * 9/2020 Liang ................... G06F 1/1649
2022/0330455 A1 * 10/2022 Lai ......................... G06F 1/206
2025/0284327 A1 * 9/2025 Sun ................... H05K 7/20145

* cited by examiner

LAPTOP COMPUTER WITH DROP-DOWN HINGE

FIELD OF THE INVENTION

The present application is related to a laptop computer with drop-down hinge, in particular to an opening is disposed on a screen of the laptop computer, and the opening is corresponding to a hole behind the opening when the laptop computer with the drop-down hinge is operated at an unfolded condition of the screen.

BACKGROUND OF THE INVENTION

A drop-down hinge is a hinge design often used in laptop displays. The hinge mechanism is disposed at the bottom of the keyboard. When the user unfolds the display, one end of the display will drop downwards into the rear of the laptop computer and hold the host up. This design not only provides a better visual experience, but also makes the laptop body more compact and aesthetically appealing.

Unfortunately, it is known that when the display of laptop computers with drop-down hinge design is unfolded, the display will block the heat dissipation holes or connection ports at the rear of the laptop. If the heat dissipation holes are blocked, the heat flow will be accumulated between the display and the host, affecting the heat dissipation performance of the laptop computer. If the connection ports are blocked, the connection ports will not be able to be connected. In order to solve these problems, the positions of the heat dissipation holes and the connection ports will be required to be reconfigured. It will ensure that the laptop maintains good heat dissipation performance and connection convenience when the laptop computer is operating. However, this also restricts the heat dissipation and port design of laptop computers with drop-down hinge, further causing the industry to give up on providing laptop computers with drop-down hinge displays.

SUMMARY OF THE INVENTION

An objective of the present application is to provide a laptop computer with drop-down hinge. A connection assembly is connected to a first casing, a lid, and a second casing. The second casing includes an opening. When the second casing rotates to unfold, the connection assembly drives the lid to rotate and move away from the opening of the second casing and hence making the opening of the second casing communicate with the holes on the first casing correspondingly.

To achieve the above objective, the present application provides a laptop computer with drop-down hinge. The heat dissipation structure comprises a first casing, a connection assembly, a second casing, a lid, and a casing positioning member. The first casing includes a hole on one side. The connection assembly is disposed at the first casing. A bottom surface of the second casing is fixed to a top of the connection assembly. The second casing includes an opening penetrating therethrough. The lid is disposed on a top of the second casing and covers the opening. A bottom surface of the lid extends downwards to form a lid extension member. A side of the lid extension member includes a pivot hole. The pivot hole is connected pivotally to the connection assembly. A lid slider is adjacent to and disposed at a side of the pivot hole. A side of the casing positioning member is fixed to the bottom surface of the second casing. Another side of the casing positioning member is perpendicular to a normal line and includes a casing sliding groove penetrating therethrough. The lid slider slides along the casing sliding groove. The first casing is connected pivotally at the second casing via the connection assembly. When the second casing rotates corresponding to the first casing via the connection assembly and makes the opening correspond to the hole, the connection assembly and the casing positioning member move the lid to make the lid rotate and project away from the opening. This structure provides the laptop computer with drop-down hinge with the display including the opening while unfolding the display and the opening may correspond to the hole at the rear of.

According to an embodiment of the present application, the connection assembly includes an shaft member, a supporting frame, a first positioning member, a first gear, a second positioning member, a second gear, and a third gear. One side of the shaft member is fixed to one side of a first connection part of the first casing. The shaft member passes through and is connected pivotally to a bottom of the supporting frame. One side of the first positioning member is fixed to one side of the supporting frame. The shaft member passes through and is connected pivotally to a bottom of the first positioning member. One side of the first gear is adjacent to the other side of the first positioning member and fixed to the other side of the shaft member. The first gear includes a first gear body and a teeth part. The second positioning member is adjacent to the other side of the first gear. The shaft member passes through and is connected pivotally to a bottom of the second positioning member. The second gear is disposed between the first positioning member and the second positioning member. The second gear engages the teeth part of the first gear. The third gear is disposed between the first positioning member and the second positioning member. The third gear engages the second gear.

According to an embodiment of the present application, the second positioning member includes an alignment body, a second positioning member sliding groove, a first pivot shaft, and a second pivot shaft. The second positioning member sliding groove passes through one side of the alignment body. One side of the first pivot shaft and one side of the second pivot shaft are fixed to the side of the alignment body. The other side of the first pivot shaft and the other side of the second pivot shaft are fixed to the other side of the first positioning member.

According to an embodiment of the present application, the second gear includes a second gear pivot hole. The first pivot shaft is connected pivotally to the second gear pivot hole.

According to an embodiment of the present application, the third gear includes a third gear pivot hole. The second pivot shaft is connected pivotally to the third gear pivot hole. The third gear includes an extension member extending from one side thereof. The extension member includes a third gear slider disposed on one side of the extension member. The third gear slider is disposed slidably in the second positioning member sliding groove correspondingly. The extension member includes a third pivot shaft on the side adjacent to the third gear slider. The pivot hole of the lid is connected pivotally to the third pivot shaft.

According to an embodiment of the present application, when the second casing rotates corresponding to the shaft member via the supporting frame, the first positioning member and the second positioning member rotate corresponding to the shaft member correspondingly. The first gear is fixed to the shaft member and drives the second gear to rotate. The second gear rotates corresponding to the first pivot shaft and drives the third gear to rotate corresponding to the second pivot shaft. The third gear slider slides along the second positioning member sliding groove. The extension member and the third pivot shaft push the lid extension member. The lid extension member drives the lid slider to slide along the casing sliding groove and makes the lid project from the opening and move to one side of the opening.

According to an embodiment of the present application, when the second casing rotates corresponding to the shaft member via the supporting frame, the first positioning member and the second positioning member rotate corresponding to the shaft member correspondingly. The second gear rotates corresponding to the shaft member. The second gear rotates corresponding to the first pivot shaft and drives the third gear to rotate corresponding to the second pivot shaft. The third gear slider slides along the second positioning member sliding groove. The lid slider slides along the casing sliding groove to retrieve the lid back to the opening.

According to an embodiment of the present application, the lid includes a magnetic member on the bottom surface. When the lid is retrieved back to the second casing completely, the lid is attached to the side of the second casing using the magnetic member corresponding to the opening.

According to an embodiment of the present application, the hole communicates with an inner side of the first casing.

According to an embodiment of the present application, the lid projects from the opening and moves to the side of the second casing to make a heat flow of the first casing to flow to the opening.

According to an embodiment of the present application, the hole further includes a connection port.

DETAILED DESCRIPTION OF THE INVENTION

In order to make the purpose, technical solutions, and advantages of the present application clearer, the present application will be further described in detail below with reference to the specific embodiments and the accompanying drawings. It should be understood that these descriptions are exemplary only and are not intended to limit the scope of the application. Furthermore, in the following description, descriptions of well-known structures and technologies are omitted to avoid unnecessarily confusing the concepts of the present application.

Schematic diagrams of the structure according to the embodiments of the present application are shown in the accompanying drawings. The drawings are not drawn to scale, with certain details exaggerated for clarity and may have been omitted. The shapes of the various regions and layers shown in the figures, as well as the relative sizes and positional relationships between them, are only exemplary. In practice, there may be deviations due to manufacturing tolerances or technical limitations, and those skilled in the art will base their judgment on the actual situation. Additional regions/layers with different shapes, sizes, and relative positions may be designed as needed.

Obviously, the described embodiments are part of the embodiments of the present application, instead of all of the embodiments. Based on the embodiments in this application, all other embodiments obtained by those of ordinary skill in the art without making any nonobvious efforts fall within the scope of protection of this application.

In the description of this application, it should be noted that the terms "first", "second", and "third" are only used for descriptive purposes and cannot be understood as indicating or implying relative importance.

In addition, the technical features involved in different embodiments of the present application described below may be combined with each other as long as they do not conflict with each other.

The disadvantage of laptops using a drop-down hinge design is that when the display is unfolded, it will block the heat dissipation holes or connection ports at the rear of the host, which reduces the heat dissipation effect of the host and causes heat flow to accumulate between the display and the host, causing damage to the electronic components in the host and blocking the connection ports.

To solve the technical problems according to the prior art as described above, the present application provides a laptop computer with drop-down hinge. The connection assembly is connected to the first casing, the lid, and the second casing. When the second casing rotates corresponding to the first casing and unfolds, the lid projects from the opening of the second casing to make the opening of the second casing correspond to the hole of the first casing. Thereby, the problem of the second casing blocking the hole of the first casing when the second casing is unfolded may be solved.

Figure 1A:
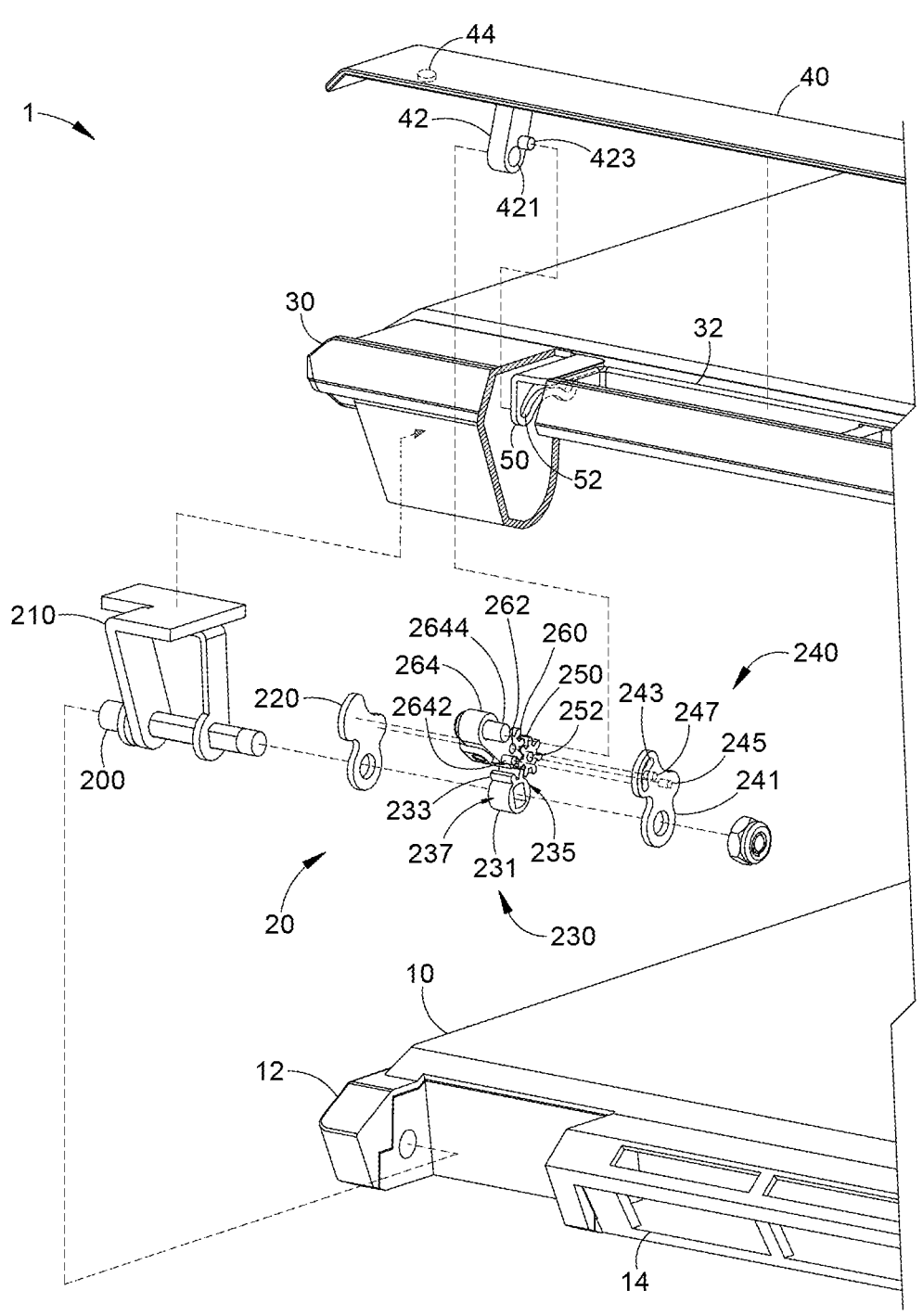
FIG. 1A shows an exploded view of the structure according to an embodiment of the present application.
Figure 1B:
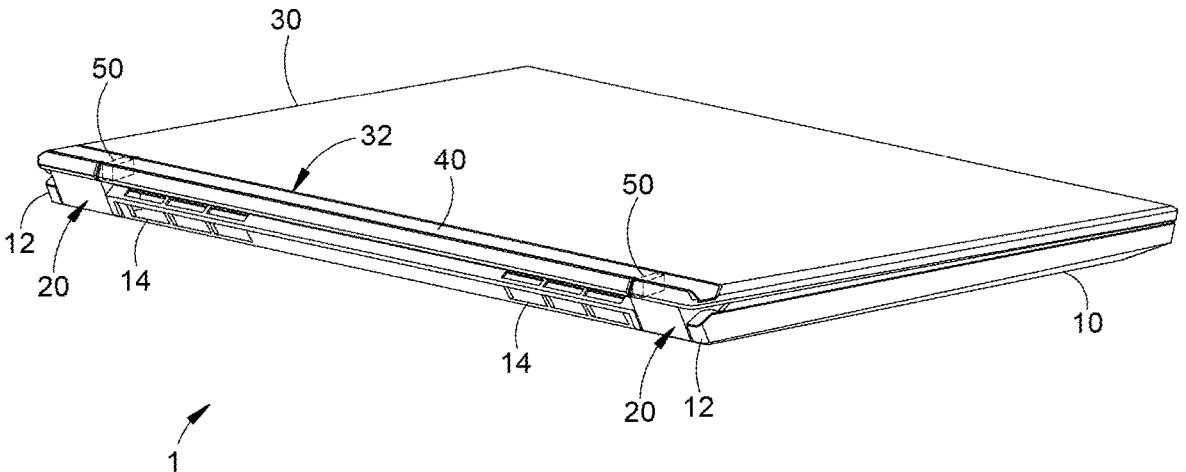
FIG. 1B shows a schematic diagram of the structure according to an embodiment of the present application.

Please refer to FIG. 1A and FIG. 1B. FIG. 1A shows an exploded view of the structure according to an embodiment of the present application; FIG. 1B shows a schematic diagram of the structure according to an embodiment of the present application. As shown in the figures, the present application is the first embodiment. A laptop computer with drop-down hinge 1 according to the present embodiment comprises a first casing 10, a connection assembly 20, a second casing 30, a lid 40, and a casing positioning member 50.

According to the present embodiment, the first casing 10 includes a hole 14 on one side. The connection assembly 20 is disposed on the side of the first casing 10 and adjacent to the hole 14. A bottom surface of the second casing 30 is fixed to a top of the connection assembly 20. The connection assembly 20 is connected to the first casing 10 and the second casing 30. The second casing 30 further includes an opening 32 penetrating therethrough. The lid 40 is disposed on a top of the second casing 30 and covers the opening 32. A bottom surface of the lid 40 extends downwards to include a lid extension member 42. The lid extension member 42 includes a pivot hole 421 on one side. The pivot hole 421 is connected pivotally to the connection assembly 20. One side of the pivot hole 421 is adjacent to a lid slider 423. One side of the casing positioning member 50 is fixed to the bottom surface of the second casing 30. The casing positioning member 50 includes a casing sliding groove 52 penetrating therethrough that is perpendicular to a normal line. The lid slider 423 of the lid extension member 42 passes through the casing sliding groove 52 so that the lid slider 423 may slide along the casing sliding groove 52.

According to the present embodiment, the first casing 10 is connected pivotally at the second casing 30 via the connection assembly 20. When the second casing 30 rotates corresponding to the first casing 10 via the connection assembly 20 and makes the opening 32 correspond to the hole 14, the connection assembly 20 and the casing positioning member 50 move the lid 40 to make the lid 40 rotate and project from the opening 32, and hence communicating the opening 32 and the hole 14.

According to the present embodiment, the first casing 10 is the host casing of a laptop computer; the second casing 30 is the display casing of the laptop computer.

According to the present embodiment, the casing sliding groove 52 is curved. This shape enables the lid 40 to project from the opening 32 or close the opening 32 when the lid slider 423 slides along the casing sliding groove 52.

Figure 2A:
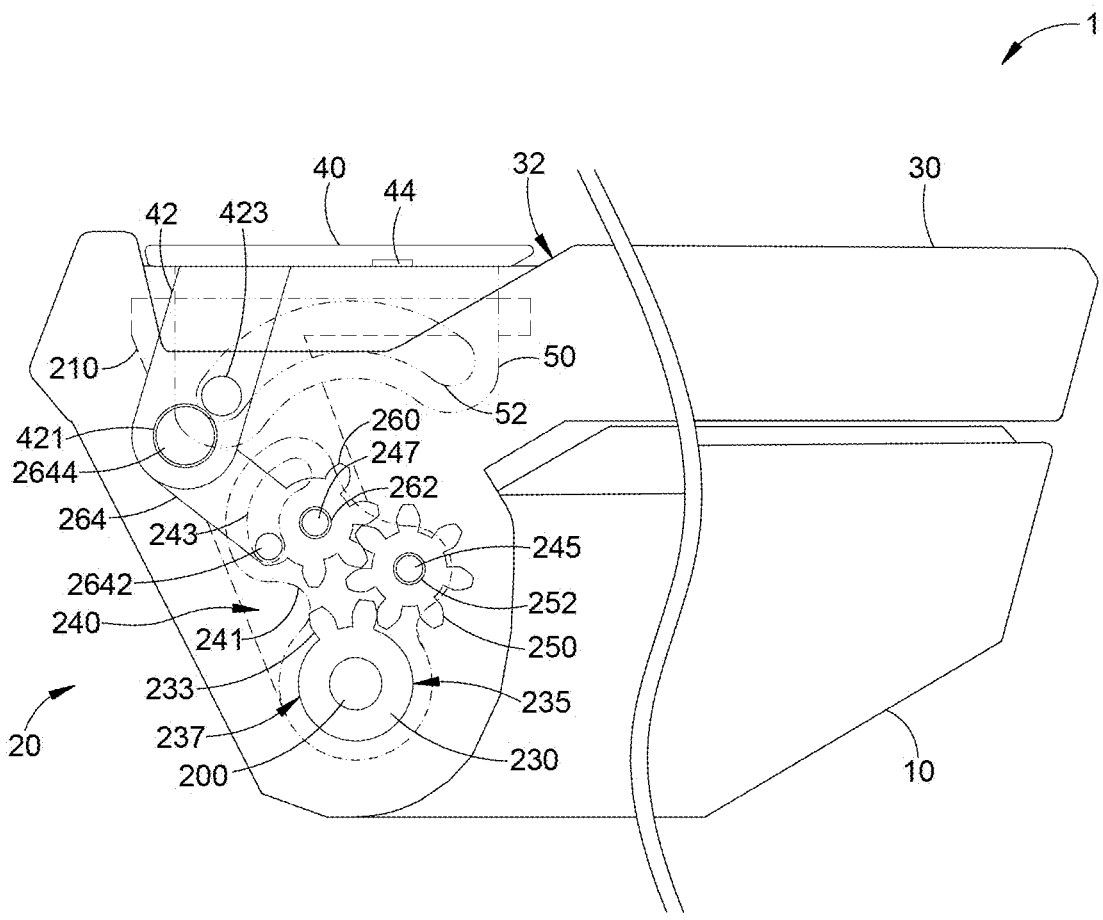
FIG. 2A to FIG. 2C show schematic diagrams of the operations according to an embodiment of the present application.
Figure 2B:
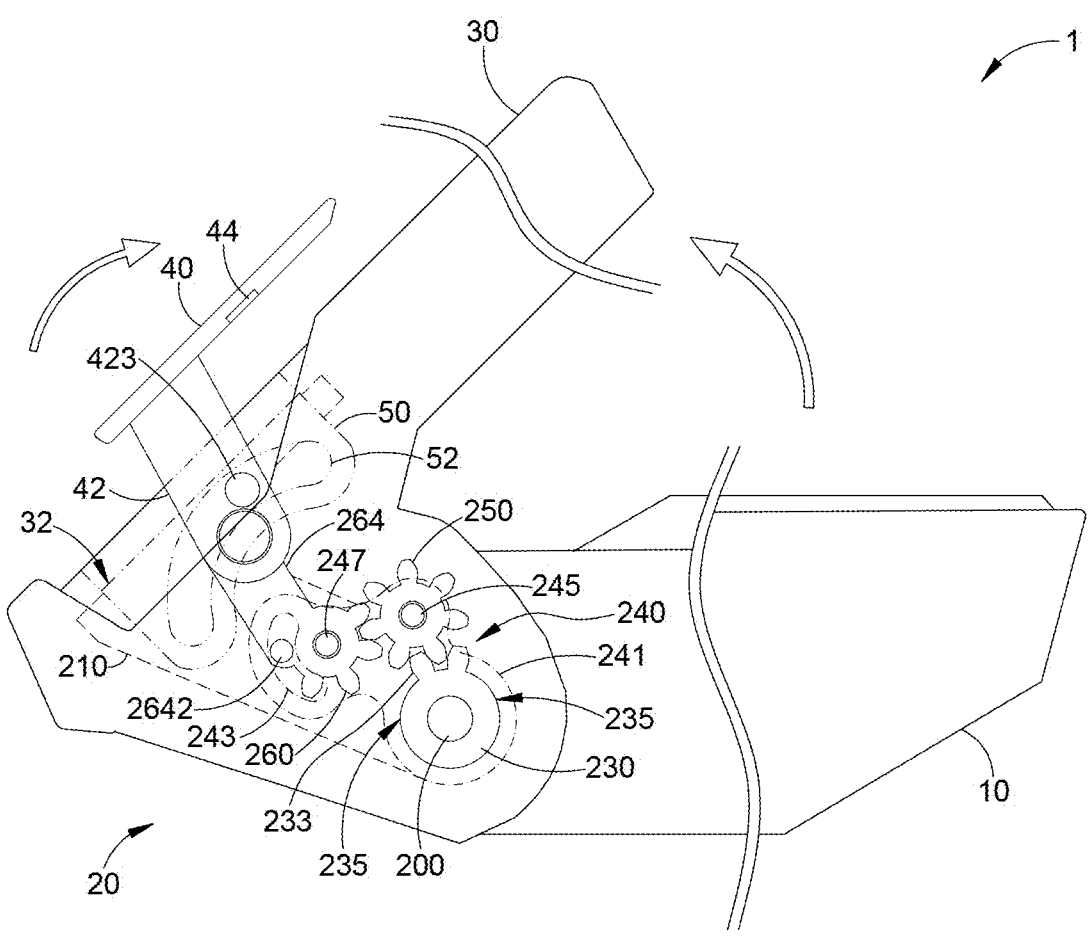
Figure 2C:
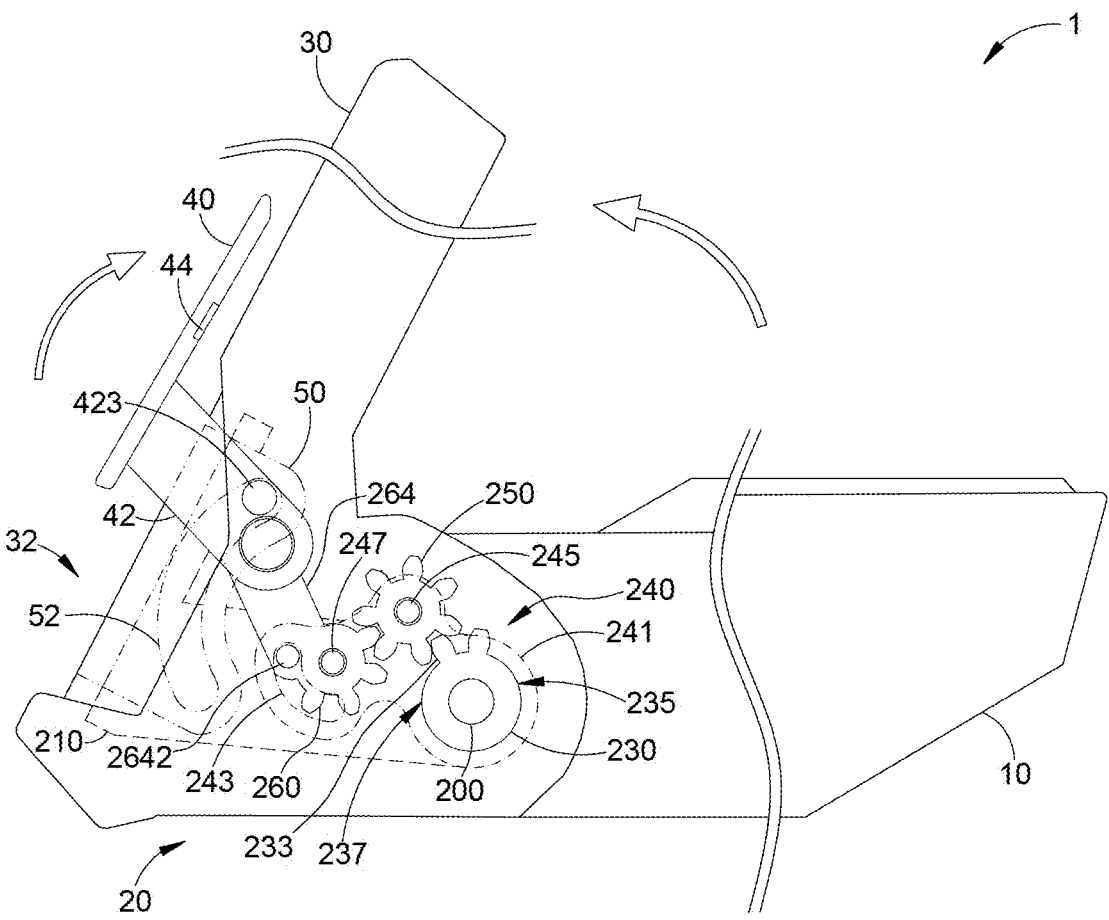
Figure 3A:
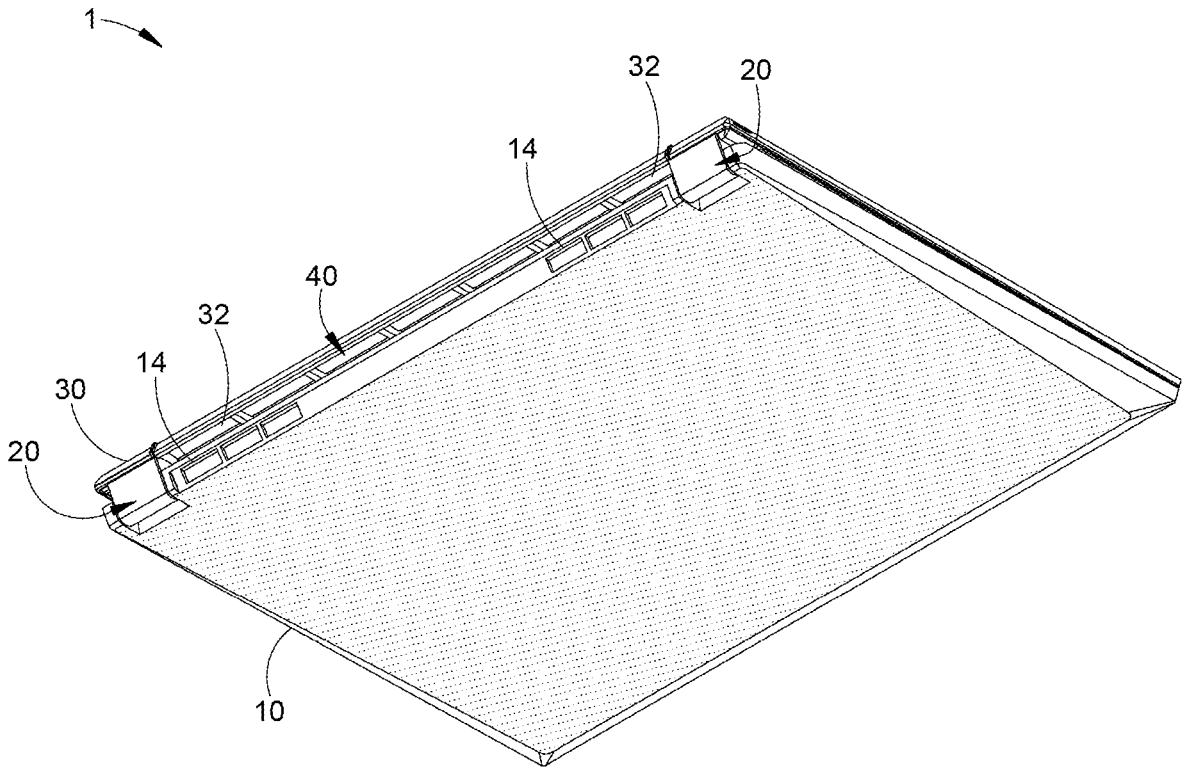
FIG. 3A to FIG. 3D show schematic diagrams of the usage status according to an embodiment of the present application.
Figure 3B:
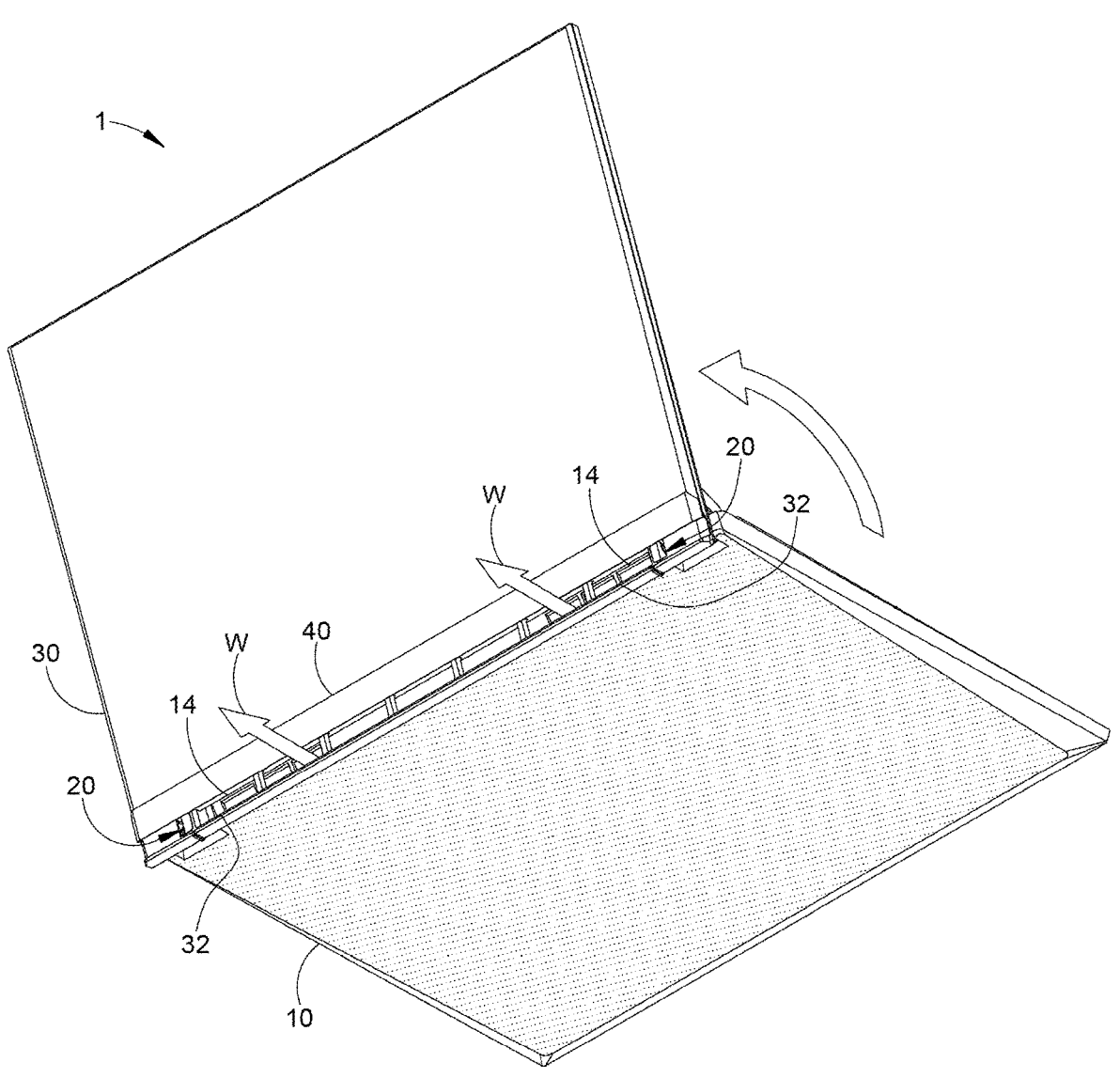
Figure 3C:
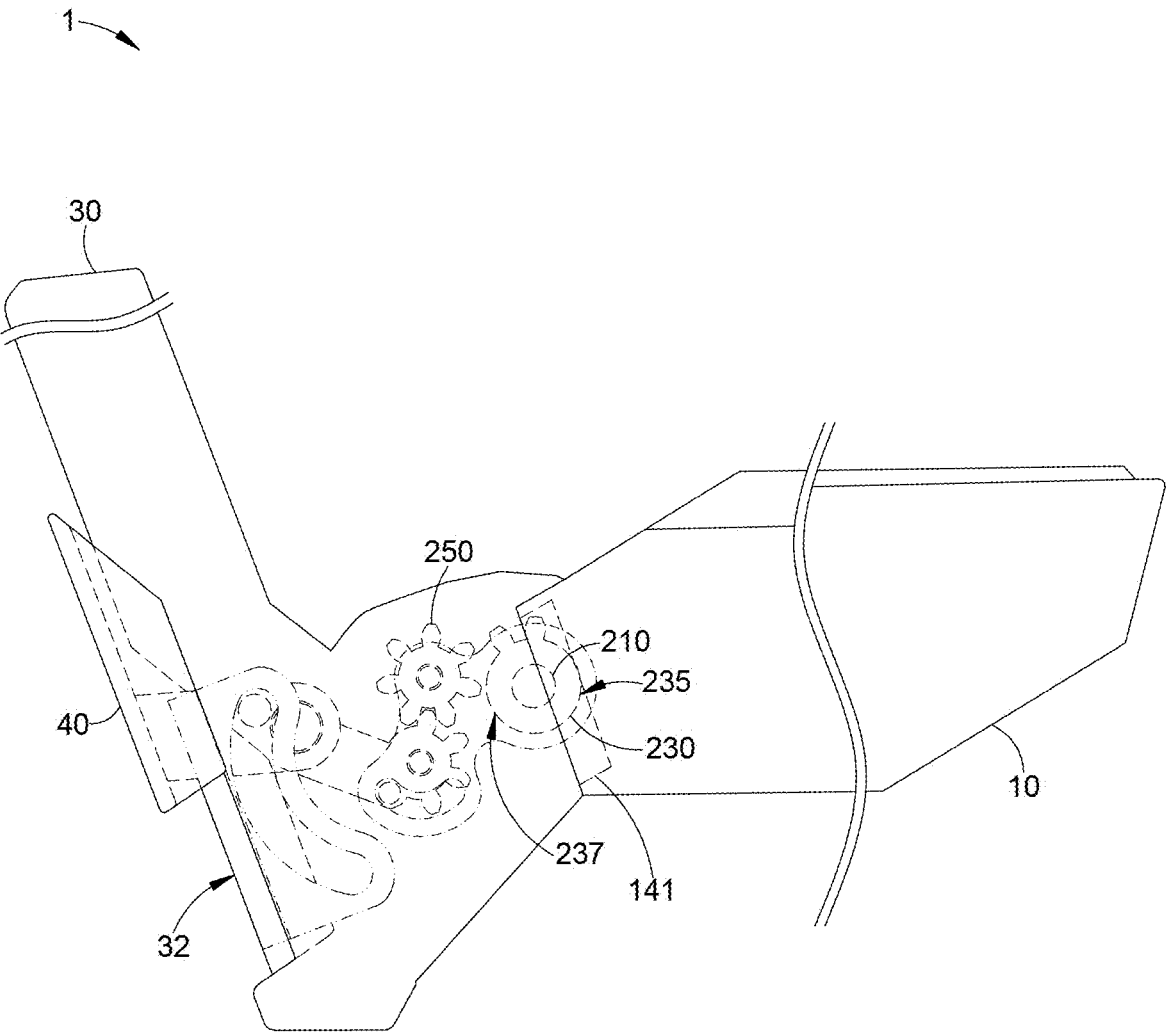
Figure 3D:
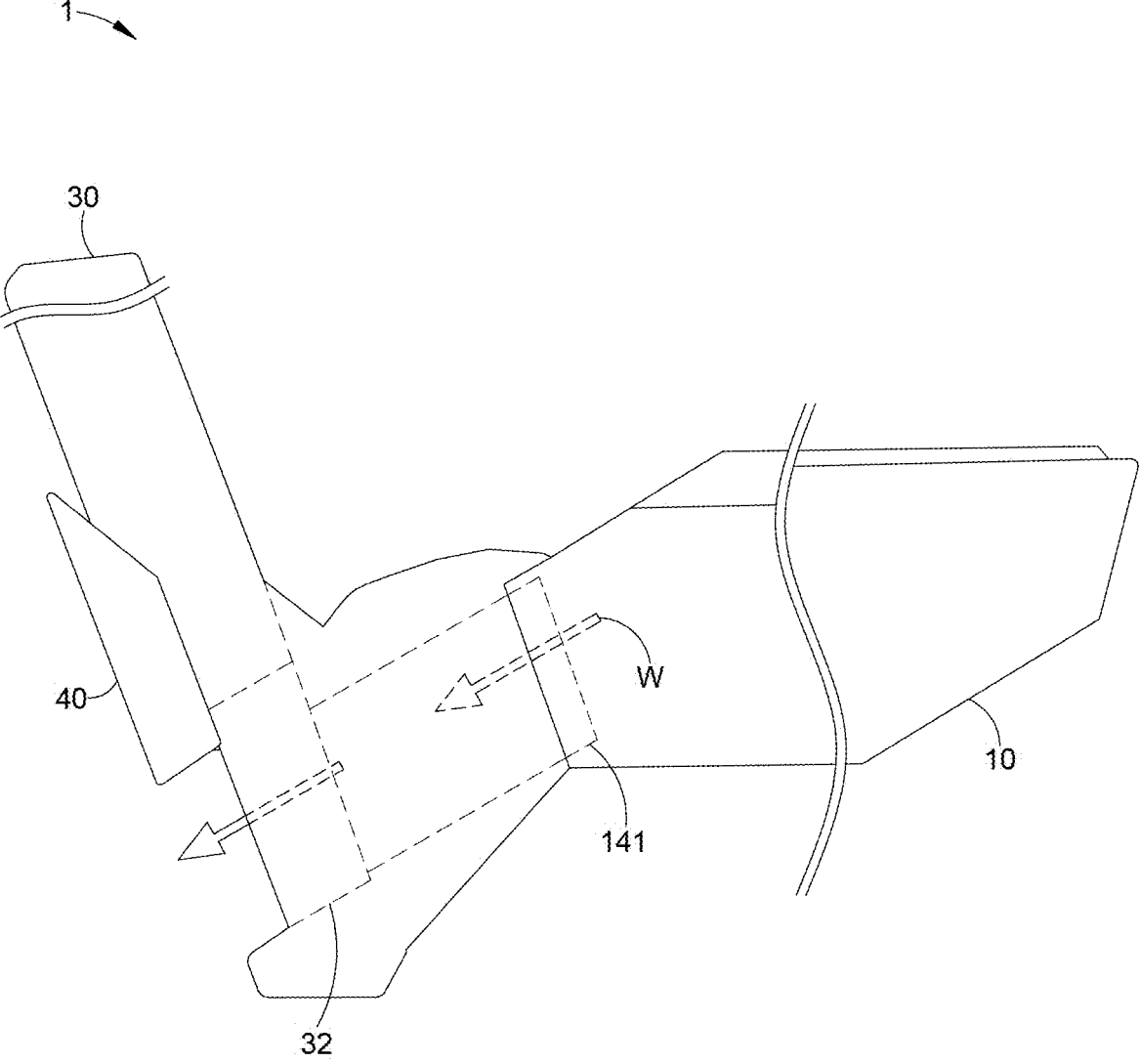

Please refer to FIGS. 1A and 1B again and to FIGS. 2A to 2C and FIGS. 3A to 3D. FIG. 2A to FIG. 2C show schematic diagrams of the operations according to an embodiment of the present application; and FIG. 3A to FIG. 3D show schematic diagrams of the usage status according to an embodiment of the present application. The present embodiment is the second embodiment based on the first embodiment described above. According to the present embodiment, the connection assembly 20 further includes an shaft member 200, a supporting frame 210, a first positioning member 220, a first gear 230, a second positioning member 240, a second gear 250, and a third gear 260.

According to the present embodiment, the side of the first casing 10 includes a first connection part 12 adjacent to the hole 14. One side of the shaft member 200 is fixed to one side of the first connection part 12. The shaft member 200 passes through and is connected pivotally to a bottom of the supporting frame 210. One side of the first positioning member 220 is fixed to one side of the supporting frame 210. The shaft member 200 passes through and is connected pivotally to a bottom of the first positioning member 220. The supporting frame 210 is connected to and supports the second casing 30.

According to the present embodiment, one side of the first gear 230 is adjacent to the other side of the first positioning member 220 and fixed to the other side of the shaft member 200. The first gear 230 includes a first gear body 231 and a teeth part 233. The teeth part 233 is disposed on the outer side of the first gear body 231. The first gear body 231 is fixed to the shaft member 200.

According to the present embodiment, the second positioning member 240 is adjacent to the other side of the first gear 230. The shaft member 200 passes through and is connected pivotally to a bottom of the second positioning member 240. The second positioning member 240 includes an alignment body 241, a second positioning member sliding groove 243, a first pivot shaft 245, and a second pivot shaft 247. The second positioning member sliding groove 243 passes through one side of the alignment body 241. One side of the first pivot shaft 245 and one side of the second pivot shaft 247 are fixed to the side of the alignment body 241. The other side of the first pivot shaft 245 and the other side of the second pivot shaft 247 are fixed to the other side of the first positioning member 220.

According to the present embodiment, the second gear 250 is disposed between the first positioning member 220 and the second positioning member 240. The second gear 250 engages the teeth part 233 of the first gear 230. The second gear 250 includes a second gear pivot hole 252. The first pivot shaft 245 of the second positioning member 240 is connected pivotally to the second gear pivot hole 252 so that the second gear 250 may rotate at the second positioning member 240.

According to the present embodiment, the third gear 260 is disposed between the first positioning member 220 and the second positioning member 240. The third gear 260 engages the second gear 250. The third gear 260 includes a third gear pivot hole 262. The second pivot shaft 247 is connected pivotally to the third gear pivot hole 262 so that the third gear 260 may rotate at the second positioning member 240. The third gear 260 includes an extension member 264 extending from one side thereof. The extension member 264 includes a third gear slider 2642 disposed on one side of the extension member 264. The third gear slider 2642 is disposed slidably in the second positioning member sliding groove 243 of the second positioning member 240 correspondingly. The extension member 264 includes a third pivot shaft 2644 on the side adjacent to the third gear slider 2642. The pivot hole 421 of the lid 40 is connected pivotally to the third pivot shaft 2644. Thereby, when the third gear 260 rotates, the lid 40 will be driven to move correspondingly.

As shown in FIGS. 2A to 2C and FIGS. 3A to 3D, according to the present embodiment, when the second casing 30 unfolds, it rotates corresponding to the shaft member 200 using the supporting frame 210. The shaft member 200 drives the first positioning member 220 and the second positioning member 240 to rotate corresponding to the shaft member 200 correspondingly. Since the first gear 230 is fixed to the shaft member 200, the shaft member 200 will drive the first gear 230 to rotate and drive the second gear 250 to rotate. The second gear 250 rotates corresponding to the first pivot shaft 245 and drives the third gear 260 to rotate corresponding to the second pivot shaft 247. When the third gear 260 rotates, it will drive the third gear slider 2642 to slide along the second positioning member sliding grove 243 to make the extension member 264 push the lid extension member 42. The lid extension member 42 drives the lid slider 423 to slide along the casing sliding groove 52, making the lid 40 project from the opening 32 and move to one side of the opening 32. At this moment, the opening 32 is clear and corresponds to the hole 14 of the first casing 10.

On the other hand, when the second casing 30 folds, it rotates corresponding to the shaft member 200 using the supporting frame 210, the first positioning member 220 and the second positioning member 240 rotate corresponding to the shaft member 200 correspondingly. In addition, the second gear 250 rotates corresponding to the shaft member 200 correspondingly. The second gear 250 rotates corresponding to the first pivot shaft 245 and drives the third gear 260 to rotate corresponding to the second pivot shaft 247. The third gear slider 2642 slides along the second positioning member sliding groove 243 to make the lid slider 423 slide along the casing sliding groove 52 and thus retrieving the lid 40 back to the opening 32.

According to an embodiment, the second positioning member sliding groove 243 is curved.

Please refer to FIGS. 1A to 2C again. The present embodiment is the third embodiment based on the second embodiment described above. According to the present embodiment, the first gear 230 further includes a first empty-stroke part 235 and a second empty-stroke part 237. The teeth part 233, the first empty-stroke part 235, and the second empty-stroke part 237 are disposed on a top of the first gear body 231.

According to the present embodiment, a bottom of the first gear 230 is fixed to the shaft member 200. When the first positioning member 220 and the second positioning member 240 rotate corresponding to the shaft member 200, the first positioning member 220 and the second positioning member 240 drive the second gear 250 to move from the first empty-stroke part 235 of the first gear 230 to the teeth part 233 for gearing there.

Before the second gear 250 moves from the teeth 233 to the second empty-stroke part 237, the second gear 250 engages the third gear 260 to make the third gear 260 rotate and thus driving the third gear slider 2642 of the extension member 264 to slide along the second positioning member sliding groove 143. Owing to the path design of the second positioning member sliding groove 243, the extension member 264 may guide the lid extension member 42 to move upwards. At this time, the lid slider 423 slides along the casing sliding groove 52. Furthermore, by using the path design of the casing sliding groove 52, the lid 40 will be removed from the opening 32 and away from the second casing 30.

When the second casing 30 continues to rotate corresponding to the shaft member 200, the second gear 250 starts to move. When the second gear 250 engages the second empty-stroke part 237 from the teeth part 233 of the first gear 230, the second gear 250 stops moving. The third gear 260 rotates and drives the third gear slider 2642 of the extension member 264 to slide along the second positioning member sliding groove 243. The path design of the second positioning member sliding groove 243 in this stage enables the extension member 264 to guide the lid extension member 42 to move. At this time, the lid slider 423 slides along the casing sliding groove 52. The path design of the casing sliding groove 52 in this stage enables the lid 40 to continue to move in parallel above the second casing 30 with a gap. When the third gear slider 2642 slides to the second positioning member sliding groove 243 and stops, the second casing 30 has been away from the first casing 10 and is connected to the first casing 10 merely by the supporting frame 210. In addition, the lid 40 enables the opening 32 of the second casing 30 to correspond to the hole 14 of the first casing 10.

When the second gear 250 rotates to the second empty-stroke part 237, no action will occur. Until the second casing 30 is folded, the second gear 250 re-engages the teeth part 233 of the first gear 230 to make the lid 40 re-cover the opening 32 of the second casing 30.

Please refer to FIGS. 1A to 2C again. The present embodiment is the fourth embodiment based on the second embodiment described above. According to the present embodiment, the lid 40 includes a magnetic member 44 on the bottom surface. When the lid 40 is retrieved back to the second casing 30 completely, the lid 40 is attached to the side of the second casing 30 using the magnetic member 44 corresponding to the opening 32.

When the third gear slider 2642 slides to the second positioning member sliding groove 243 and stops, the lid 40 projects from the second casing 30 completely and moves to one side of the opening 32. Then the lid 40 is attached to one side of the second casing 30 using the magnetic member 44.

Please refer to FIGS. 1A to 3D again. The present embodiment is the fifth embodiment based on the first embodiment or the second embodiment described above. According to the present embodiment, the hole 14 of the first casing 10 communicates with an inner side of the first casing

10 for dissipating heat. For example, the exhaust of the heat dissipation module of the first casing 10 communicates with the hole 14.

According to the present embodiment, when the lid 40 projects from the opening 32 and moves to the side of the second casing 30, a heat flow W of the first casing 10 flows outwards via the hole 14 to the opening 32. Thereby, the heat flow W from the hole 14 will not be blocked by the second casing 30 and may convect with the ambient via the opening 32.

According to an embodiment, the heat flow W is generated by the electronic devices such as CPU, graphic processor, memories, and solod-state hard disks inside the first casing 10.

Figure 4A:
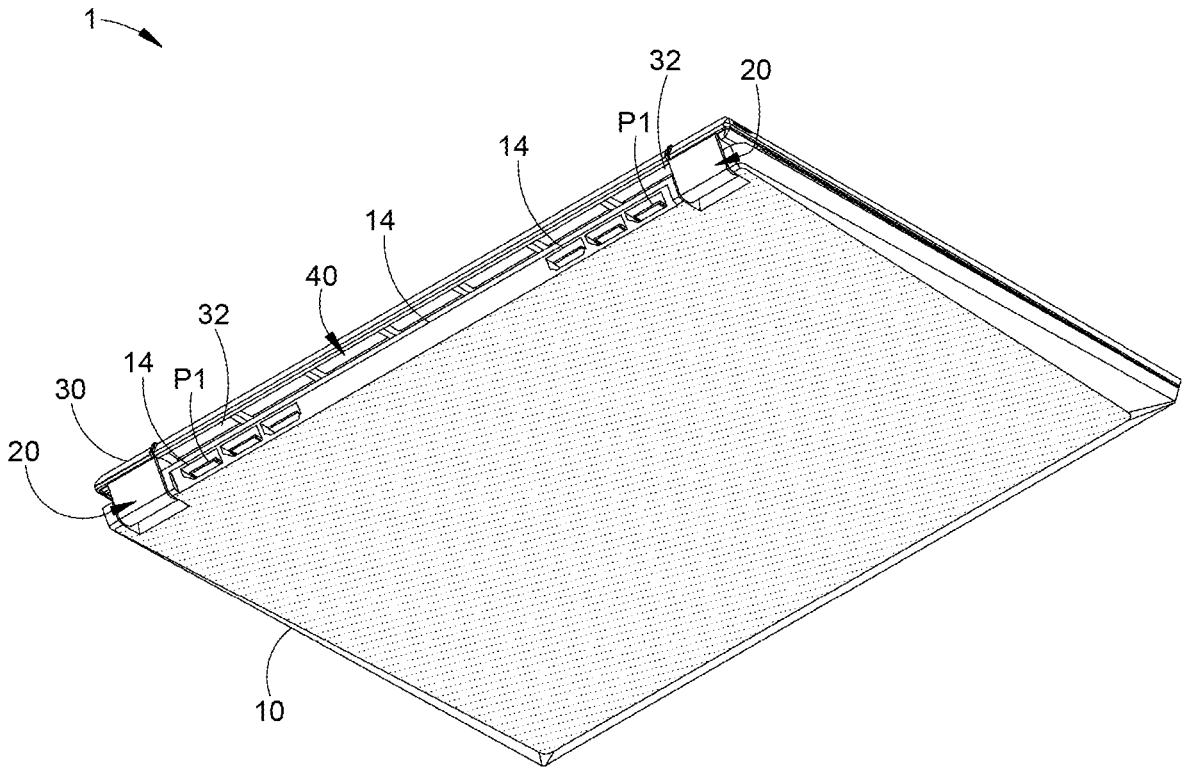
FIG. 4A to FIG. 4B show schematic diagrams of the usage status according to another embodiment of the present application.
Figure 4B:
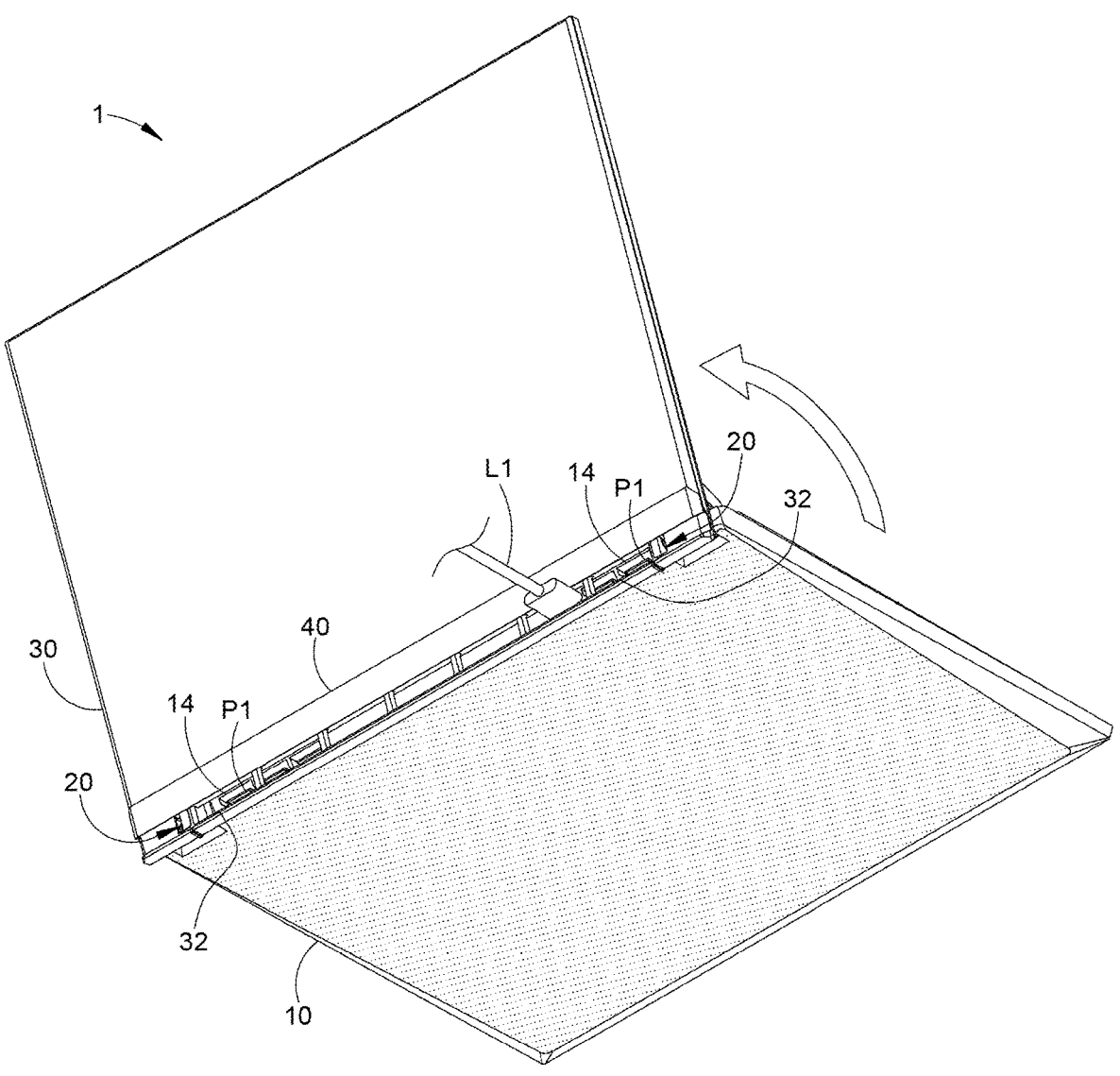

Please refer to FIGS. 1A to 3C again and to FIG. 4A to FIG. 4B. FIG. 4A to FIG. 4B show schematic diagrams of the usage status according to another embodiment of the present application. The present embodiment is the sixth embodiment based on the first embodiment or the second embodiment described above. According to the present embodiment, the hole 14 of the first casing 10 further includes a connection port P1.

According to the present embodiment, when the lid 40 projects from the opening 32 and moves to the side of the second casing 30, the opening 32 of the second casing 30 corresponds to the hole 14 of the first casing 10 and the connection port P1. Thereby, a connection line L1 may pass through the opening 32 and connect electrically to the connection port P1.

According to an embodiment, the connection port P1 may be an image connection port (such as DP, HDMI), a USB connection port, an audio connection port (such as Combo jack), or a network connection port. The corresponding connection line L1 may be an image connection line (such as DP, HDMI), a USB connection line, an audio connection line (such as Combo jack), or a network connection line. Nonetheless, the present application is not limited to the embodiment.

To sum up, the present application provides a laptop computer with drop-down hinge. When the second casing rotates corresponding to the shaft member to unfold, the lid will project from the outer side of the second casing using the connection assembly. Then the heat dissipation hole of the first casing will correspond to the opening of the second casing and dissipate the heat flow. Thereby, when a laptop computer with drop-down hinge is unfolded, the problem of damage on the electronic devices inside the host may be solved due to heat accumulation between the display and the host caused by the display blocking the heat dissipation hole at the rear of the host. In addition, when a laptop computer with drop-down hinge is unfolded, the problem of the display blocking the connection port at the rear of the host may be solved as well.

Accordingly, the present application conforms to the legal requirements owing to its novelty, nonobviousness, and utility. However, the foregoing description is only embodiments of the present application, not used to limit the scope and range of the present application. Those equivalent changes or modifications made according to the shape, structure, feature, or spirit described in the claims of the present application are included in the appended claims of the present application.

The invention claimed is:

1. A laptop computer with drop-down hinge, comprising:
   a first casing, including a hole on one side;
   a connection assembly, disposed at said first casing, said connection assembly comprising:

a shaft member, with one side fixed to one side of a first connection part of said first casing;

a supporting frame, said shaft member passing through and connected pivotally to a bottom of said supporting frame;

a first positioning member, with one side fixed to one side of said supporting frame, and said shaft member passing through and connected pivotally to a bottom of said first positioning member;

a first gear, with one side adjacent to the other side of said first positioning member and fixed to the other side of said shaft member, and including a first gear body and a teeth part;

a second positioning member, adjacent to the other side of said first gear, and said shaft member passing through and connected pivotally to a bottom of said second positioning member;

a second gear, disposed between said first positioning member and said second positioning member, and engaging said teeth part of said first gear; and a third gear, disposed between said first positioning member and said second positioning member, and engaging said second gear;

a second casing, with a bottom surface fixed to a top of said connection assembly, and including includes an opening penetrating therethrough;

a lid, disposed on a top of said second casing and covering said opening, a bottom surface of said lid extending downwards to include a lid extension member, said lid extension member including a pivot hole on one side, said pivot hole connected pivotally to said connection assembly, and one side of said pivot hole adjacent to a lid slider; and a casing positioning member, with one side fixed to said bottom surface of said second casing, including a casing sliding groove penetrating therethrough that is perpendicular to a normal line, and said lid slider sliding along said casing sliding groove;

wherein said first casing is connected pivotally at said second casing via said connection assembly; when said second casing rotates corresponding to said first casing via said connection assembly and makes said opening correspond to said hole, said connection assembly and said casing positioning member move said lid to make said lid rotate and project from said opening.

2. The laptop computer with drop-down hinge of claim 1, wherein said second positioning member comprising an alignment body, a second positioning member sliding groove, a first pivot shaft, and a second pivot shaft, said second positioning member sliding groove passes through one side of said alignment body; one side of said first pivot shaft and one side of said second pivot shaft are fixed to said side of said alignment body, the other side of said first pivot shaft and the other side of said second pivot shaft are fixed to the other side of said first positioning member.

3. The laptop computer with drop-down hinge of claim 2, wherein said second gear comprising a second gear pivot hole, and said first pivot shaft is connected pivotally to said second gear pivot hole.

4. The laptop computer with drop-down hinge of claim 2, wherein said third gear comprising a third gear pivot hole; said second pivot shaft is connected pivotally to said third gear pivot hole; said third gear includes an extension member extending from one side thereof; said extension member includes a third gear slider disposed on one side thereof, said third gear slider is disposed slidably in said second positioning member sliding groove correspondingly;

said extension member includes a third pivot shaft on the side adjacent to said third gear slider; and said pivot hole of said lid is connected pivotally to said third pivot shaft.

5. The laptop computer with drop-down hinge of claim 4, wherein when said second casing rotates corresponding to said shaft member via said supporting frame, said first positioning member and said second positioning member rotate corresponding to said shaft member correspondingly; said first gear is fixed to said shaft member and drives said second gear to rotate; said second gear rotates corresponding to said first pivot shaft and drives said third gear to rotate corresponding to said second pivot shaft; said third gear slider slides along said second positioning member sliding groove; said extension member and said third pivot shaft push said lid extension member, and said lid extension member drives said lid slider to slide along said casing sliding groove and makes said lid project from said opening and move to one side of said opening.

6. The laptop computer with drop-down hinge of claim 4, wherein when said second casing rotates corresponding to said shaft member via said supporting frame, said first positioning member and said second positioning member rotate corresponding to said shaft member correspondingly; said second gear rotates corresponding to said shaft member; said second gear rotates corresponding to said first pivot shaft and drives said third gear to rotate corresponding to said second pivot shaft, said third gear slider slides along said second positioning member sliding groove; and said lid slider slides along said casing sliding groove to retrieve said lid back to said opening.

7. The laptop computer with drop-down hinge of claim 1, wherein said lid includes a magnetic member on said bottom surface; and when said lid is retrieved back to said second casing completely, said lid is attached to said side of said second casing using said magnetic member corresponding to the opening.

8. The laptop computer with drop-down hinge of claim 1, wherein said hole communicates with an inner side of said first casing.

9. The laptop computer with drop-down hinge of claim 8, wherein said lid projects from said opening and moves to a side of said second casing to make a heat flow of said first casing to flow to said opening.

10. The laptop computer with drop-down hinge of claim 1, wherein said hole further includes a connection port.

* * * * *